United States Patent [19]

Maziorka

[11] Patent Number: 5,022,740

[45] Date of Patent: Jun. 11, 1991

[54] INSTRUMENT GAUGE LIGHT PROJECTION DEVICE

[75] Inventor: Jack Maziorka, Arlington, Tex.

[73] Assignee: Steve Forthner, Grand Prairie, Tex.

[21] Appl. No.: 460,823

[22] Filed: Jan. 4, 1990

[51] Int. Cl.[5] .............................................. G02B 27/02

[52] U.S. Cl. .................................... 350/114; 350/235; 350/452; 350/168

[58] Field of Search ............... 350/113, 114, 235, 237, 350/445, 446, 448, 452, 629, 630, 413, 431, 168; 362/29, 30, 31, 62, 64, 455

[56] References Cited

U.S. PATENT DOCUMENTS

| | | | |
|---|---|---|---|
| 3,064,125 | 11/1962 | Gott | 350/452 |
| 4,642,736 | 2/1987 | Masuzawa et al. | 362/31 |
| 4,648,690 | 3/1987 | Ohe | 362/31 |
| 4,813,764 | 3/1989 | Morris | 350/235 |

*Primary Examiner*—Bruce Y. Arnold

*Assistant Examiner*—Loha Ben

*Attorney, Agent, or Firm*—Kenneth C. Hill

[57] ABSTRACT

A light projection device suitable for use on aircraft instruement panels includes a light source contained within a housing. The housing is mounted to the instrument panel adjacent a gauge to be illuminated. The housing has an extension thereon which projects toward the adjacent gauge, and through which light is projected. Contained within the housing extension is a light redirection device having a graded transmissibility function. The graded transmissibility of this redirection device causes a higher proportion of light projected from the device to be directed to the far side of the gauge. This graded transmissibility function provides for more even illumination over the surface of the gauge. The graded light redirection device may be, for example, a Fresnel lens having selected optical properties.

20 Claims, 3 Drawing Sheets

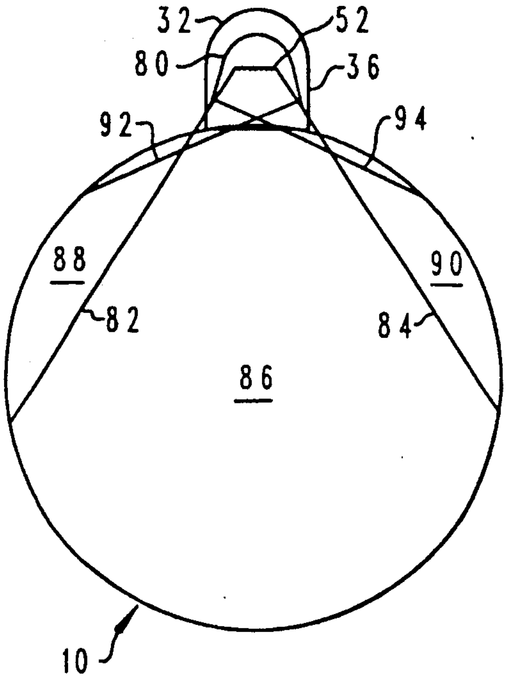
Fig. 7
Fig. 8
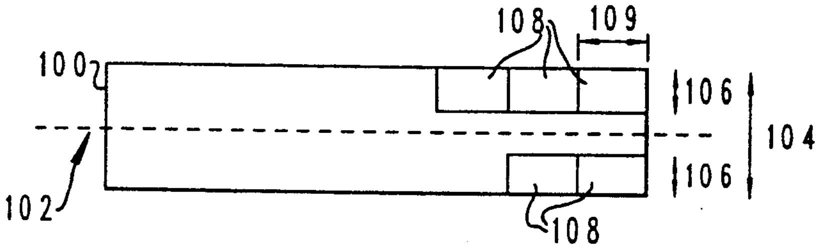
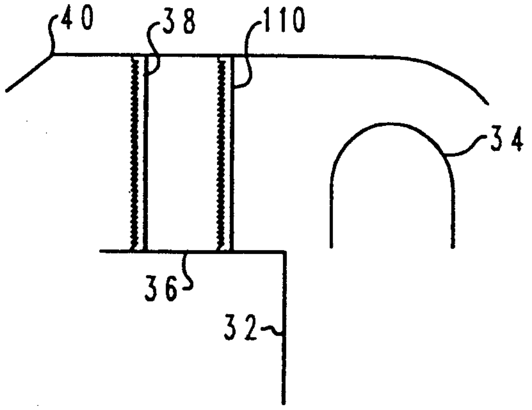
Fig. 9
Fig. 10
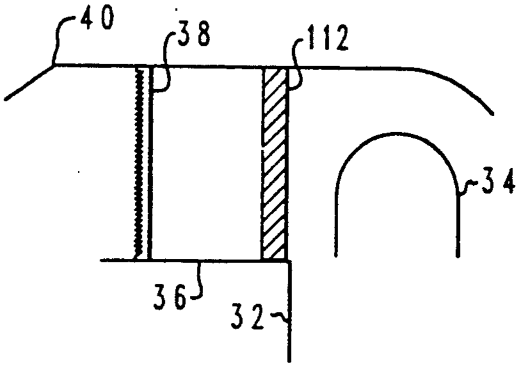

INSTRUMENT GAUGE LIGHT PROJECTION DEVICE

BACKGROUND OF THE INVENTION

1. Field of the Invention

The present invention relates generally to light projection devices, and more specifically to such a device suitable for use on aircraft instrument panels.

2. Description of the Prior Art

Modern aircraft instrument panels have a large number of gauges and other instruments for providing information to a pilot. These gauges must be illuminated at night. Nightime illumination is usually accomplished by mounting a light source in a housing adjacent each gauge. The optical design of the housing causes light to be projected onto the gauges of the instrument panel.

Such a technique has a problem with uniform illumination of instruments since the light source is located at one edge of the gauge. The far edge of a gauge tends to receive less light than the edge nearest the source. This variation in light intensity across the gauge makes it more difficult to read and does not meet adequately the needs of aircraft pilots.

It is often important to minimize the amount of light projected onto portions of the instrument panel other than the gauges to which it is directed. The amount of light projected directly onto the pilot's field of vision should also be minimized. Illumination control of each individual gauge is desirable. Glare from the aircraft instrument panel may cause night blindness or interfere with the performance of night vision goggles such as used on military aircraft. Minimizing the amount of light used on the instrument panel helps minimize degradation in the pilot's night vision caused by looking at the instrument panel. In order to minimize the amount of light applied, it is important that the light which is available is confined as much as possible to the gauges themselves, and that uniform illumination over the gauge surface is provided.

FIG. 1 illustrates diagrammatically how illumination of aircraft instrument gauges is accomplished. A planar instrument gauge 10 is typically 3 inches in diameter and mounted nearly flush with the surface of an instrument panel. A light source 12 is mounted on the instrument panel adjacent the gauge 10. Light source 12 provides, in most cases, the sole source of illumination of gauge 10.

In order to minimize the amount of light scattered from portions of the instrument panel other than the gauge 10, military specifications provide limits on the amount of light spillover which may occur beyond the edges of a 5 inch diameter circle 14 concentric with the gauge 10. For military helicopters illuminated with post lights, military specifications require that the illumination of every point of the surface of the gauge 10 be between 0.5 and 1.5 foot lamberts. Such specifications further require that the illumination caused by source 12 beyond the limits of the circle 14 be no greater than 0.1 foot lambert.

FIG. 2 is a side view of the gauge 10 and light source 12 of FIG. 1. As can be seen in FIG. 2, the gauge projects slightly above the surface of the instrument panel. Housing 12 contains a light source (not shown) internally, and light is projected from an opening 16 facing the gauge 10. Optics contained within the source 12, typically a prism, with no magnification, cause light projected from the opening 16 to be directed downward onto the gauge 10. Ideally, the projected light will be contained only within a cone delimited by lines 18 and 20. In practice, a reasonably large percentage, but not all, of the projected light occurs in this region.

Since one edge of the gauge 10 is more or less immediately adjacent the source 12, this portion of the gauge 10 tends to receive a significantly higher level of illumination than the opposite side of the gauge 10. The illumination falling on gauge 10 from source 12, is typically proportional to the inverse of the square of the distance from source 12. This uneven illumination over the surface of the gauge 10 is a problem which has not been satisfactorily solved using current light source 12.

It would be desirable for a light source to provide more uniform illumination of an instrument gauge, with a minimum amount of light spill-over beyond the boundary of the gauge. It would be especially desirable for such a source to be inexpensive and for it to be a plug compatible replacement for existing light sources.

SUMMARY OF THE INVENTION

It is therefore an object of the invention to provide a light projection device suitable for use on aircraft instrument panels which provides an even illumination over the surface of an adjacent gauge.

It is another object of the present invention to provide such a light projection device which minimizes the amount of projected light which falls outside an area defined by the adjacent gauge.

It is a further object of the present invention to provide such a light projection device which can be fabricated as a plug compatible replacement for existing light projection devices on aircraft instrument panels.

Therefore, according to the present invention, a light projection device suitable for use on aircraft instrument panels includes a light source contained within a housing. The housing is mounted to the instrument panel adjacent a gauge to be illuminated. The housing has an extension thereon which projects toward the adjacent gauge, and through which light is projected. Contained within the housing extension is a light redirection device having a graded transmissibility function. The graded transmissibility of this redirection device causes a higher proportion of light projected from the device to be directed to the far side of the gauge. This graded transmissibility function provides for more even illumination over the surface of the gauge. The graded light redirection device may be, for example, a Fresnel lens having selected optical properties.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIG. 7 is a cut-away top view of a light projection device according to the present invention;

FIG. 8 illustrates one technique with which a Fresnel lens can be made to provide desired optical properties according to the present invention;

FIG. 9 is a fragmentary cut-away view of a second alternative embodiment of a light projection device according to the present invention; and FIG. 10 is a fragmentary cut-away view of a third alternative embodiment of a light projection device according to the present invention.

DESCRIPTION OF THE PREFERRED EMBODIMENT

Since a light projection device located adjacent an instrument gauge approximates, to some degree, a point source of light, it will become apparent to those skilled in the art that a greater intensity of light must be projected toward those portions of the gauge located most distant from the source in order to provide uniform illumination. Since the source approximates a point source, the illumination provided on a given unit area will decrease approximately proportional to the square of the distance from the source. Thus, in order to provide uniform illumination over the surface of the gauge, it is important that light be redirected within the source so as to properly illuminate the further reaches of the gauge.

Figure 1:
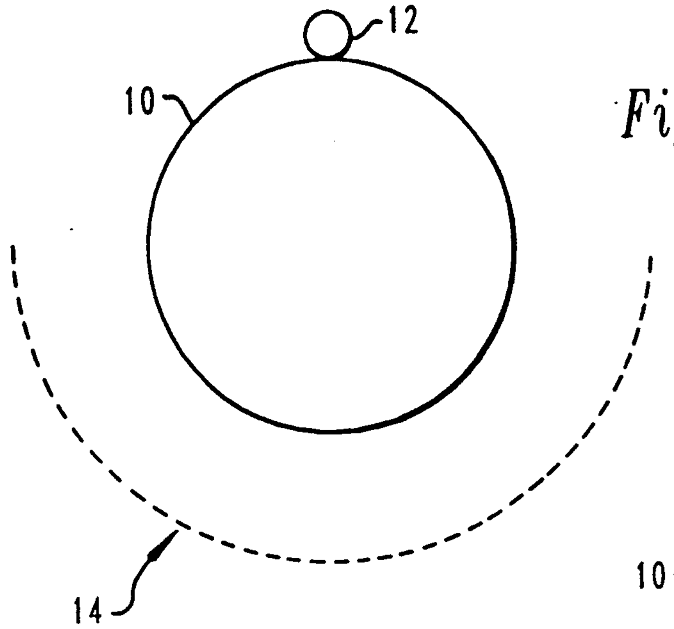
Fig. 1 (prior art)
FIG. 1 is a diagrammatic top view of a light projection device located adjacent a gauge as known in the prior art.
Figure 2:
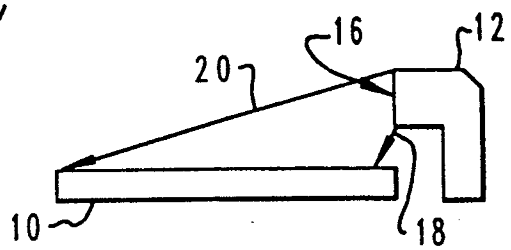
Fig. 2 (prior art)
FIG. 2 is a diagrammatic side view of the gauge and light projection device of FIG. 1.
Figure 3:
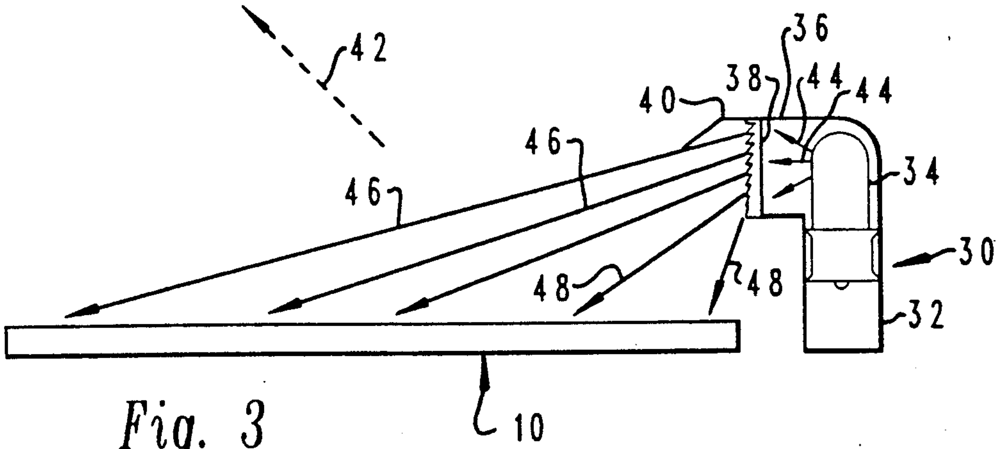
FIG. 3 is a cut-away side view of a preferred light projection device according to the present invention.

Referring to FIG. 3, a light projection device 30 is mounted in an instrument panel adjacent an instrument gauge 10. The device 30 includes a housing base 32 into which is mounted a bulb 34. Electrical connections made to power the bulb 34 are known in the art and are not shown in FIG. 3.

The device 30 also includes a horizontally projecting housing extension 36 which is directed to point toward the center of the gauge 10. The base 32 is light tight except for light which escapes through the housing extension 36. A Fresnel lens 38 is mounted vertically within the extension 36 so as to completely fill the opening. Lens 38 has optical properties which are described in connection with FIG. 4. A projection 40 of the extension 36 extends beyond the Fresnel lens 38 to prevent direct-line visual contact of the lens 38 by a pilot. Projection 40 angles downward both to better prevent direct-line visual contact with the lens 38 and to reflect light down onto the gauge 10. Arrow 42 indicates the approximate direction from the gauge 10 and device 30 location to the pilot's eye.

Light projected by bulb 34 is indicated generally with arrows 44. The light projected by bulb 34 is directed toward the surface of the gauge 10 by fresnel lens 38. The optical properties of lens 38 are chosen so that a greater proportion of light is directed only slightly downward toward the opposite side of the gauge 10 as shown by arrows 46. A lesser amount of light is redirected more sharply downward onto the near portions of the gauge 10 as indicated by arrows 48. A measurement of light intensity made in a vertical plane just beyond the lens 38 would show that more light is transmitted through the upper portions thereof. This is necessary in order to provide an illumination per unit area on the far side of the gauge 10 which matches that of the near-side.

Typical dimensions for the device of FIG. 3, used for illuminating a gauge 10 having a 3 inch diameter, provide for a light projection device 30 which is approximately ½ inch tall. The lens 38 is substantially rectangular and approximately 0.25 inch tall by 0.4 inch wide. A vertical center line through housing base 32 is located approximately ¼ to ½ inch from the near edge of gauge 10.

Figure 4:
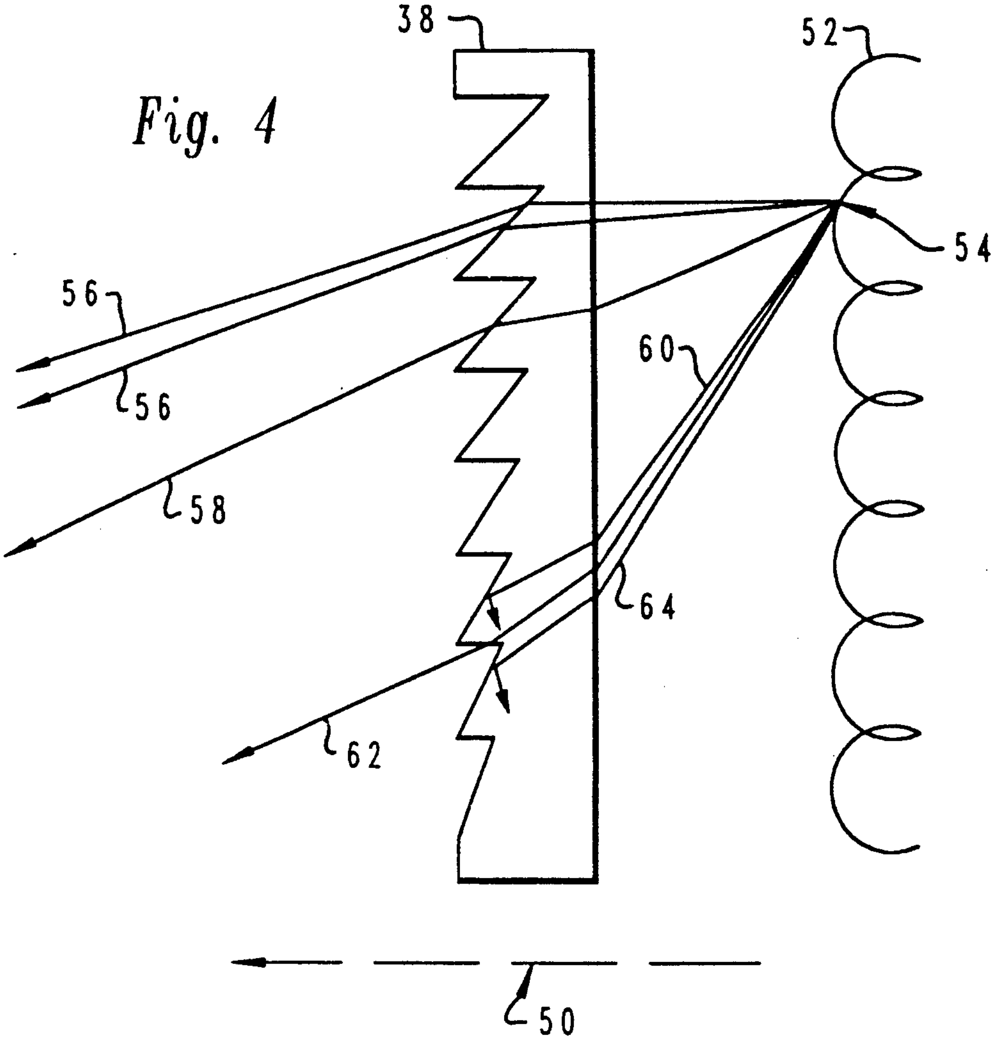
FIG. 4 is a diagram illustrating operation of a Fresnel lens in a light projection device.

Referring to FIG. 4, an illustration of a Fresnel lens operating as a graded transmission light redirection device is shown. Lens 38 is preferably a cylindrical lens having an optical axis located away from the lens 38 at the position shown by arrow 50. Since the optical axis is located below the lens 38 itself, facets cut into the lens 38 are cut to varying depths as shown in FIG. 4. The depths of the grooves cut into lens 38 are greatly exaggerated in FIG. 4 for clarity of explanation. In addition, lens 38 preferably has grooves cut to a density of 100 lines per inch, for a total of approximately 25 lines in a ¼ inch tall lens 38.

Lenses having different optical properties can be used. For example, a linear deflection Fresnel lens could be used for lens 38 instead of a cylindrical lens. The cross-section of such a lens would be different than shown on FIG. 4. For a linear deflection lens, all of the grooves are cut to the same depth. However, such different lenses function in a similar manner to the following description of a cylindrical lens.

Bulb 34 contains a filament 52 which generates light when heated to incandescence. Filament 52 emits light for its entire length; FIG. 4 illustrates what happens to light emitted from a signal point on the filament 52 in several directions.

Light emitted horizontally from point 54 is deflected downward by the lens 38 as shown by lines 56. Light emitted at an angle slightly below the horizontal is also deflected downward as shown by line 58.

Light which is emitted toward the lower regions of the lens 38, as depicted by lines 60, 62, 64, behaves differently due to the properties of the fresnel lens. Some light, represented by line 62, is refracted through lens 38 and directed downward onto the gauge. Light which travels along lines 60 and 64, however, does not escape from the front of lens 38 at all. Instead, it impinges upon the facets of the lens at a shallow angle, and is reflected internally. This is the well-known property of total internal reflection. The net result is that only a portion of the light emitted from point 54 toward the lower regions of the lens 38 is transmitted; the remainder is reflected internally and exits the lens 38 at the bottom, where it is absorbed by the housing extension 36. The greater the angle below horizontal at which light is emitted from a given point on the element 52, the lower the proportion of emitted light which actually passes through the lens 38 for projection onto the gauge 10. This occurs for all points of the filament 52, so that the net effect of the lens is to, in addition to redirecting the light downwardly toward the gauge, provide a graded filter which blocks more light in the lower portions. Since light leaving the lower portion of the filter 38 is directed onto the nearer regions of the gauge 10, while that passing through the upper portion of the lens 38 is directed toward the farther regions of the gauge 10, more light is transmitted through the upper portions of lens 38 than through the lower portions. This balances the $1/R^2$ loss for illumination of the far side of the gauge 10, resulting in a more uniform illumination over the entire surface of the gauge.

Figure 5:
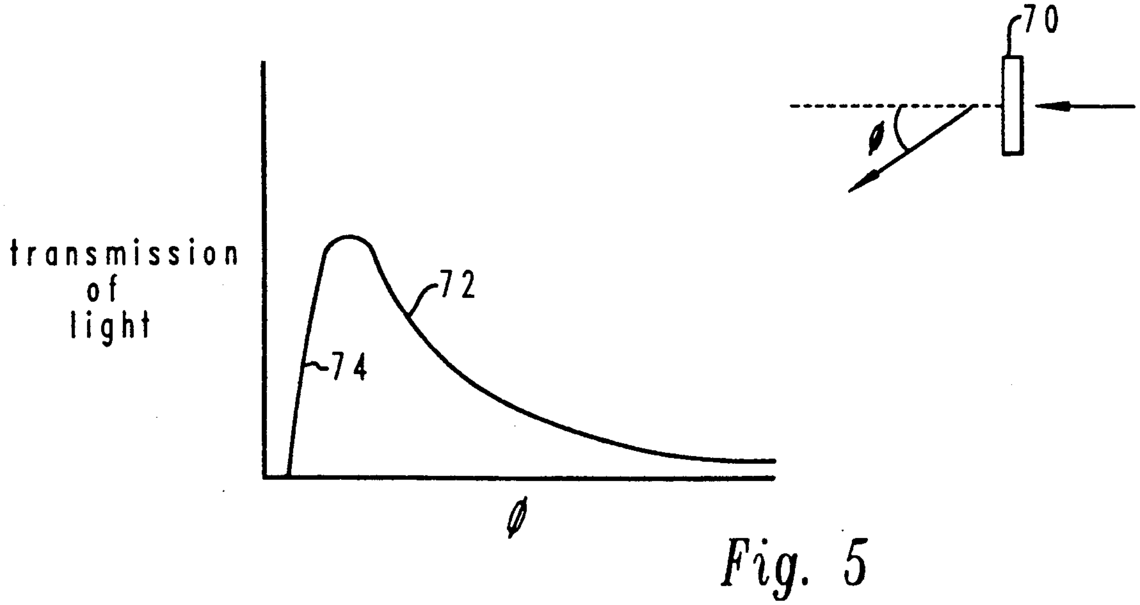
FIG. 5 is a diagrammatic view of a light redirection element having a graded transmissibility function.

Although a Fresnel lens is used in the preferred embodiment, other optical devices which have a graded transmission function could be used. FIG. 5 is a graph illustrating a preferred transmission function for a light redirection device according to the present invention. Light passing through a generic redirection device 70 is directed downward from the horizontal by an angle $\phi$. Curve 72 shows the transmission function of redirection device 70 as a function of the angle $\phi$. As seen in FIG. 5, more light is transmitted for smaller values of $\phi$, with less transmitted for larger values of $\phi$. Curve 72 represents a $1/R^2$ function, which compensates for the $R^2$ loss to the further portions of the gauge.

Since redirection device 70 directs light downward, very little light is transmitted for values of $\phi$ approaching zero. This is shown by curve 74. The combined curves 72 and 74 represent a complex function of the degree of redirection performed by redirection device 70 and its graded transmission properties.

Figure 6:
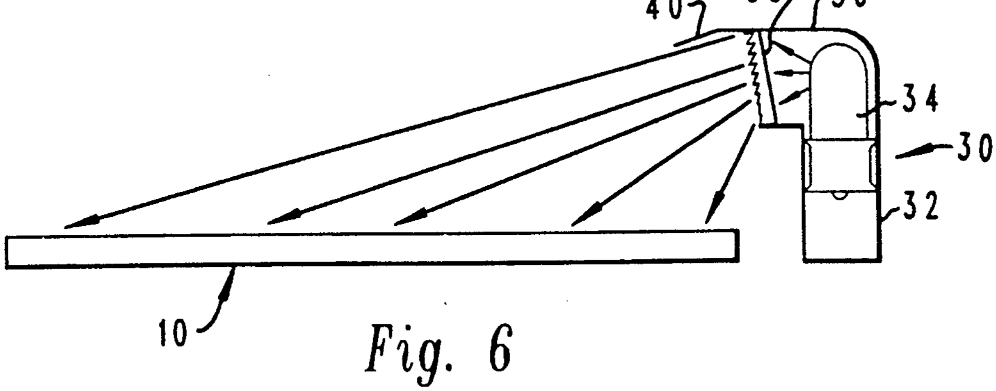
FIG. 6 is a cut-away side view of an alternative embodiment of a light projection device according to the present invention.

FIG. 6 shows an alternative embodiment of a light projection device 30 in which the lens 38 is tilted so that its upper edge moves toward the gauge 10 relative to the lower edge. A ray tracing exercise such as described in connection with FIG. 4 shows that, for this arrangement, light is redirected toward the gauge 10 with slightly less spillover beyond the far edge of the gauge 10 while retaining the graded transmission properties described above. A similar effect can be obtained by changing the optical properties of the Fresnel lens to shorten its focal length.

FIG. 7 shows a cut-away top view of either of the device of FIGS. 3 or 6. Included within the housing base 32 and extension 36 is a curved reflector 80. The precise curvature of the reflector 80 is not an important factor of the present invention, and may be, for example, parabolic or semi-circular. Reflector 80 may also have flat rather than curved surfaces, such as a V-shaped cross-section with the open end toward the gauge 10. The purpose of the reflector 80 is to increase illumination of portions of the gauge 10 which otherwise would tend to be somewhat darker than the rest.

Lines 82 depict the limit of a region 86 which is fully illuminated directly by the entire width of bulb filament 52. Regions 88 and 90 receive only a partial direct illumination by the filament 52, because a portion of the filament 52 is blocked from view by the edges of the housing extension 36. Lines 92 and 94 border regions 88 and 90 which are illuminated in part by light reflected from reflector 80. Without the reflector 80, a cone-shaped brighter area 86 would be present on the gauge 10, but the addition of reflector 80 helps brighten regions 88 and 90 to provide a more even illumination. Reflector 80 extends behind filament 52 in order to increase the overall level of illumination provided to the gauge 10. In addition, the illumination in regions 88 and 90 is increased by light reflected from the top of the device 40 shown in FIG. 3.

FIG. 8 illustrates one technique by which Fresnel lenses having the desired optical properties as described above can be obtained. FIG. 8 is a front view of a rectangular Fresnel lens 100. Lens 100 is optically cylindrical, having an optical plane 102 passing through the center. Lens 100 preferably has a height 104 of ¾ inch, and a focal length also of ¾ inch. Distance 106 is approximately ½ inch. In an area approximately ¼ inch wide along the edges away from the optical axis 102, rectangular regions 108 can be cut from the lens 100. Each of these rectangular regions 108 is suitable for use as the lens 38. Lens 100 preferably has approximately 100 lines/inch, but other line densities may be used for lens 100. Lenses having different sizes, focal lengths, and offsets from the optical axis can be used depending upon the application. The specifications of any required infrared absorbing filters (See FIG. 10) can affect the desired specifications for the lens 38.

FIG. 9 shows a second alternative embodiment of a projection device which utilizes two Fresnel lenses. A second lens 110 is placed between the lens 38 and bulb 34. Lens 110 is preferably a magnifying Fresnel lens, and has the property of making the light source, represented by bulb 34, appear larger to lens 38. When bulb 34 appears larger to lens 38, it also appears closer, And the light from the bulb 34 is more collimated when it encounters the lens 38. This has the effect of increasing the proportion of light which is subject to total internal reflection within the lower portions of lens 38, thereby increasing the gradient of the light transmission function of lens 38. This results in decreasing the amount of light provided to near portions of the gauge relative to the amount of light transmitted to further portions. If desired, lens 38 may be tilted toward the gauge in the manner shown in the embodiment of FIG. 6.

FIG. 10 shows a third alternative embodiment of a projection device which utilizes a single Fresnel lens in combination with a light filter 112. Filter 112 allows light having selected wave lengths to be selectively passed. For example, in certain military aircraft applications, it is necessary to ensure that infrared radiation is not used to illuminate the gauge 10 to avoid interfering with a pilot's used of infrared vision equipment. In such cases, filter 112 can be a green filter which blocks infrared radiation. In other applications, a red or orange filter can be used to preserve a pilot's normal night vision. The light transmission properties of filter 112 can be selected to suit the particular application.

Filter 112 is shown as mounted separately from lens 38. The precise location of the filter 112 is not generally important to the optical properties of the device. The lens 38 and filter 112 can be bonded into a single unit to simplify mounting if desired. It is also possible to form the grooves of the Fresnel lens directly onto a glass or plastic which inherently has the desired filtering properties, or a coating can be applied to the lens 38.

A light projection device as described above provides for more even illumination of a planar gauge by a light source located adjacent one edge of the gauge. This is accomplished by providing a light redirection device having a light transmission function which varies with the angle of redirection. Relatively less light is provided to near portions of the gauge, which has the effect of providing a more uniform illumination per unit area over the surface of the gauge. Such a light projection device can easily be made to be a plug compatible substitute for existing devices, thereby improving the illumination of gauges in current aircraft cockpits without requiring an expensive redesign of the instrument panels. Such an improved light projection device can be manufactured easily and cheaply, and provides a significant improvement in aircraft gauge illumination.

Fresnel lenses have been described as preferred because they combine low cost with good optical properties. However, as described in connection with FIG. 5, optical devices other than Fresnel lenses can be used according to the present invention. For example, a traditional glass or plastic lens could be used if it were properly coated to provide a graded transmission function. The relatively new technology of binary optics, in which relief patterns are deposited or etched on a substrate, could also provide a light redirection element having the desired properties.

While the invention has been particularly shown and described with reference to a preferred embodiment, it will be understood by those skilled in the art that various changes in form and detail may be made therein without departing from the spirit and scope of the invention.

What is claimed is:

1. A light projection device for illuminating a substantially planar surface, comprising:

a housing extending substantially perpendicular to the plane of the surface, and located adjacent said surface;

a housing extension connected to said housing, said extension extending toward the planar surface and having an opening for transmitting light;

a light source located within said housing near its junction with said housing extension; and a Fresnel lens mounted in said housing extension adjacent the opening for directing light emitted by said source toward the planar surface, said Fresnel lens having a graded transmission function, wherein more light is transmitted at angles directed toward farther regions of the surface, and less light is transmitted at angles directed toward closer regions of the surface, whereby a relatively even level of illumination is achieved over the surface.

2. The device of claim 1, wherein said Fresnel lens is a cylindrical lens having an optical axis below said lens.

3. The device of claim 1, wherein said Fresnel lens is a linear deflection lens.

4. The device of claim 1, wherein said Fresnel lens lies in a plane substantially perpendicular to the plane of the planar surface.

5. The device of claim 1, wherein said Fresnel lens is inclined from a vertical plane with a lower edge, closer to the planar surface, also closer horizontally to said housing than an upper edge thereof.

6. The device of claim 1, further comprising a reflector mounted within said housing and housing extension and having an open end toward the housing extension opening.

7. The device of claim 6, wherein said reflector is curved.

8. The device of claim 1, further comprising a second Fresnel lens mounted in said housing extension between said Fresnel lens and said light source.

9. The device of claim 8, wherein said second Fresnel lens is a magnifying lens.

10. The device of claim 1, wherein the planar surface is an upper surface of an instrument in a aircraft cockpit.

11. The device of claim 1, further comprising:

a filter element, located in a light path from said light source and extending through said Fresnel lens, for selectively blocking selected wavelengths of light while transmitting other selected wavelengths of light.

12. The device of claim 11, wherein said filter element blocks infrared radiation.

13. A light projection device for illuminating a substantially planar surface, comprising:

a light source having an opening located approximately perpendicularly from an edge of the planar surface and spaced therefrom; and a light redirection element located in the opening for directing light toward the surface, said light redirection element having a graded transmission function, wherein more light is transmitted at angles directed toward farther regions of the surface, and less light is transmitted at angles directed toward closer regions of the surface, whereby a relatively even level of illumination is achieved over the surface.

14. The device of claim 13, wherein said light redirection element comprises a Fresnel lens.

15. The device of claim 14, wherein said Fresnel lens is a cylindrical lens having an optical axis below said lens.

16. The device of claim 15, wherein said lens is positioned in a plane substantially perpendicular to the plane of the planar surface.

17. The device of claim 15, wherein said lens is positioned in a plane angled from a perpendicular to the plane of the planar surface.

18. The device of claim 14, wherein said Fresnel lens is a linear deflection lens.

19. The device of claim 14, further comprising a second Fresnel lens located parallel to said Fresnel lens and further into said light source.

20. The device of claim 19, wherein said second Fresnel lens is a magnifying lens.

* * * * *